W. B. SPENCER.
ANIMAL TRAP.
APPLICATION FILED FEB. 10, 1910.
1,043,162.
Patented Nov. 5, 1912.
2 SHEETS—SHEET 1.
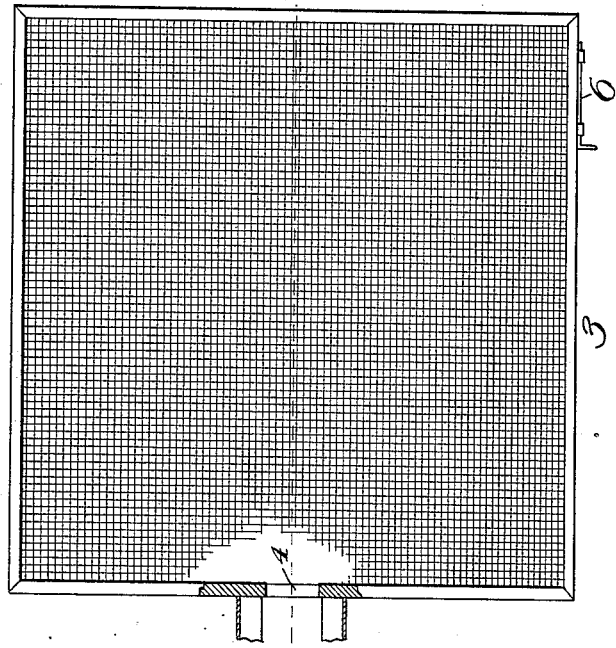
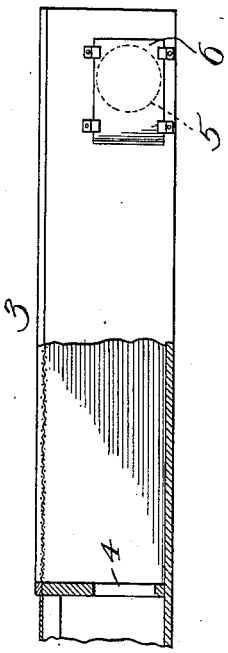
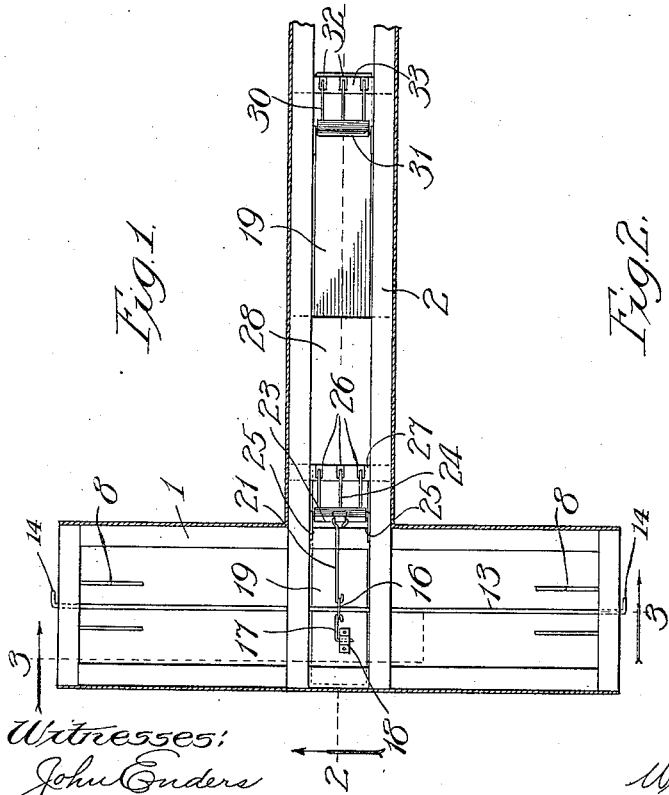
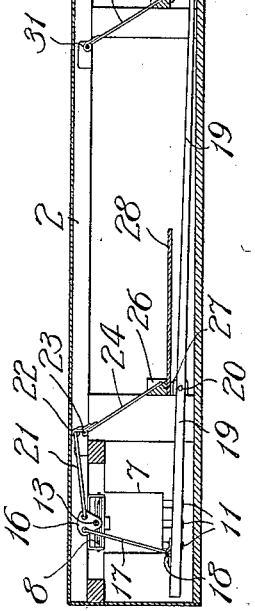
Fig.1.
Fig.2.
Witnesses:
John Enders
Chas. H. Bull
Inventor:
William B. Spencer
By David H. Fletcher
Atty.

W. B. SPENCER.
ANIMAL TRAP.
APPLICATION FILED FEB. 10, 1910.
1,043,162.
Patented Nov. 5, 1912.
2 SHEETS—SHEET 2.
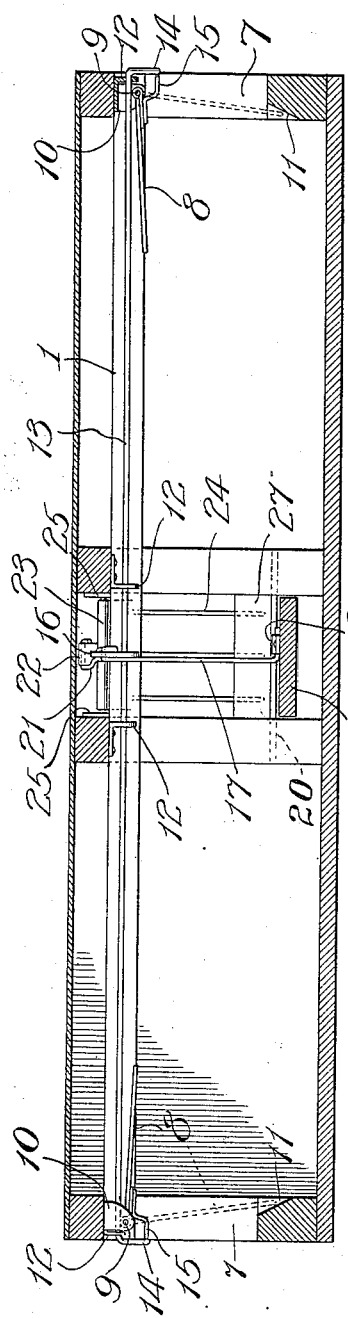
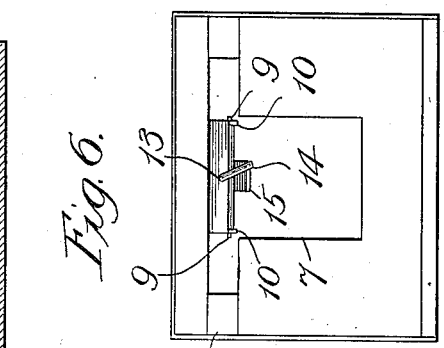
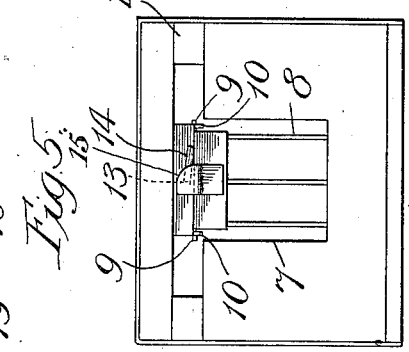
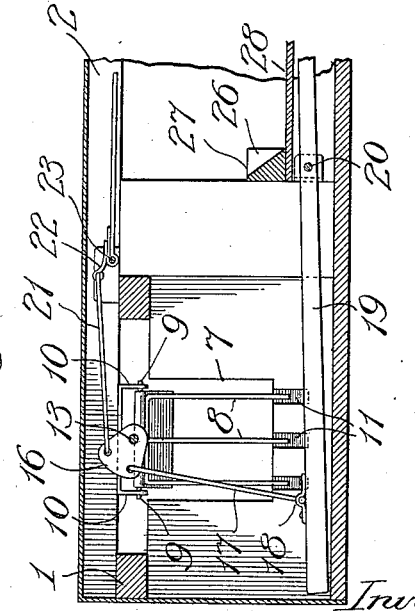
Witnesses:
John Enders
Chas. H. Bull
Inventor:
William B. Spencer
By David H. Fletcher,
Atty.

UNITED STATES PATENT OFFICE.

WILLIAM B. SPENCER, OF CHICAGO, ILLINOIS.

ANIMAL-TRAP.

1,043,162.  Specification of Letters Patent.  Patented Nov. 5, 1912.

Application filed February 10, 1910. Serial No. 543,100.

*To all whom it may concern:*

Be it known that I, WILLIAM B. SPENCER, a citizen of the United States, residing at Chicago, in the county of Cook and State of Illinois, have invented certain new and useful Improvements in Animal-Traps, of which the following is a description, reference being had to the accompanying drawings, forming a part of this specification, in which corresponding numerals of reference in the different figures indicate like parts.

The fact is well recognized by students of animal habits, that an untamed animal will rarely enter any place with which it is unfamiliar unless it is apparent that it can readily escape therefrom, and if a trap is sprung by an animal before it is secured or if it escapes therefrom, it will seldom if ever enter the trap a second time.

The object of my invention is to take advantage of this fact and to so construct an animal trap that it may present an appearance as much as possible in harmony with the environment of the animals to be trapped and that it may indicate a possibility of escape so that their fears may not be aroused.

To these ends my invention consists in the combination of elements hereinafter more particularly described and definitely pointed out in the claims.

In the drawings, Figure 1 is a plan view of the trap, embodying the features of my improvement portions thereof being shown in section, Fig. 2 is a vertical sectional view taken upon the line 2—, Fig. 1, viewed in the direction of the arrow there shown, a portion of the device being in elevation, Fig. 3 is a vertical sectional view taken upon the line 3—, Fig. 1, viewed in the direction of the arrow there shown, Fig. 4 is an enlarged view of the portion of the features shown in Fig. 3, Fig. 5 is an end elevation showing one of the outer gates as it would appear when closed, and Fig. 6 is a like view showing the gate open.

Referring to the drawings, 1 represent a skeleton frame inclosing the main runway which is connected with a similar frame 2 arranged at right angles thereto and leading to a corral or cage 3 having an entrance 4 and a final outlet 5 indicated in dotted lines in Fig. 2, and normally closed by means of a sliding gate 6. As it is well known that a rat or other similar animal will exhaust all means of escape before attempting to gnaw his way out, I prefer to form the top and sides of the runways of wood, straw-board or any suitable material with which the animal in his natural environment is likely to be most familiar. It may even be covered with loose boards, corn cobs, boxes, straw or any analogous material that will temporarily serve to define the runway and the bottom may be the ground itself or the floor of the building in which it is placed. An entrance 7 is provided at each end of the main runway, said entrance being provided with a gate 8 having pintles 9 at the top which are pivotally supported in brackets 10 attached to the frame. The lower ends of the bars forming the gates 8 are adapted to enter notches 11, Figs. 2, 3 and 4, formed in the lower part of the frame so as to prevent said bars from being displaced by an entrapped animal when the gates are closed.

Mounted in bearings 12 in the upper part of the frame and extending lengthwise of the runway 1 is a rock-shaft 13, the ends of which are bent at right angles thereto to form arms 14, Figs. 3, 5 and 6, each arm being so adjusted as to engage a cam lug 15 upon the cross-bar at the top of the gate, the construction being such that when the shaft is rocked in one direction the gates are closed while a reverse movement serves to open them.

Rigidly attached to the rock shaft midway between its ends is a sector shaped crank element 16, one portion of which is jointedly connected by means of a rod 17 to a lug 18 attached to a pivoted floor 19, pivoted at 20 to a point on the lower part of the frame at or near the entrance of the runway 2. The pivoted floor 19 corresponds substantially in width to that of the runway 2 and its forward or short end extends across the runway 1, so that an animal passing through said runway will step upon it. The rear end of said pivoted floor is extended within the runway 2 to the last gateway hereinafter mentioned and is adapted to rest normally upon the base portion or framework of said trap as shown in Fig. 2, thereby raising the forward end so that an animal cannot pass through the outer runway without depressing said outer end and lifting the inner one.

A rod 21 has one end connected to the sector 16 and the other to a short arm 22 which is rigidly attached to and extended upwardly from a cross-bar 23, which forms the upper portion of a gate 24 at the entrance to the runway 2, the ends of said cross-bar being pivoted in lugs 25 upon the upper part of the frame. The lower end of the gate bars are arranged to enter notches 26 in a cross-bar 27 to prevent displacement when the gate is closed. The parts are so adjusted that when the gates 8 are open the gate 24 will be closed.

A stationary platform 28 is located above the pivoted floor 19, extending from the cross-bar 27 rearwardly as shown, so as to form a portion of the runway 2 for the purpose hereinafter stated.

At or near the end of the runway 2 leading to the opening 4 of the corral 3 is a normally closed gravity gate 30 having a cross-bar 31 at the top, the ends of which are supported in bearings in the frame. Said gate is constructed like the other gates, with the lower ends of the bars entering notches 32 in a cross-bar 33, so that the gate may be opened by an animal in the runway when moving toward the corral, but closed against movement from the opposite side.

The operation of said device is as follows: When an animal approaches either entrance to the main runway, both gates 8 being open, it can see a clear passage through the runway which it therefore enters without fear. The end of the pivoted floor or platform 19 is far enough away from the entrance gates 8 to permit it to approach it without causing a movement of any of the parts. Upon attempting to cross the platform, however, its weight causes the outer end to descend and the inner one within the runway 2 to rise, thereby closing the gates 8 and opening the gate 24. The pivoted floor 19 is so adjusted that it will remain in the last position in which it is placed until reversed by a weight upon the opposite side of the pivot 20. The animal is, therefore, free to run back and forth in the runway 1 without affecting said pivoted floor, but as soon as it enters the second runway and steps from the platform 28 upon the pivoted floor, the position of the latter is reversed, the gate 24 closed behind it and the gates 8 opened. The purpose of the platform 28 is to permit the animal to enter the runway 2 and to get well away from the gate 24 before reversing the pivoted floor 19. Otherwise it might become alarmed before passing entirely through the gate. Being in the second runway with the gate 24 closed behind it, it soon discovers that the gate 30 will yield to pressure and enters the corral 3.

An important feature of the device is that the gates operate practically without noise and there is nothing in its operation which tends to frighten the animal and cause it to give an alarm to its fellows. The corral may be at such a distance as to give no hint that the runways thereto form any part of a trap and when an animal is secured within the secondary runway, the presence of its fellows in the corral tend to attract it.

Having thus described my invention, I claim:

1. The combination in an animal-trap, of a main runway having normally open gates at its ends, a secondary runway for connecting the first with a corral, a normally closed gateway between said runways, a pivoted floor extending lengthwise of said secondary and into the first runway, means connected with said floor for closing said first named gates and opening the other when a weight is applied to that part of the floor within said first runway, means for reversing the movement of said gates when weight is applied to the floor within said secondary runway, a rigid floor for covering a portion of said pivoted floor within said secondary runway from the entrance gate, a corral and an inwardly opening gate leading thereto from said secondary runway.

2. In an animal trap, the combination of a primary runway having normally open gates at the opposite ends, said runway being substantially straight to permit one entrance thereto to be seen from the other, a secondary runway for connecting said primary runway with a corral, a corral at the end of said secondary runway, a gravity gate at said end opening into said corral but inoperable therefrom, a pivoted balanced floor element extending from said primary runway into said secondary runway, means for connecting the same with the gates at the entrance of said runways to operate those leading to the primary runway in one direction while that leading therefrom is reversed with respect to the other two and a stationary floor element located at the entrance of said secondary runway above, but shorter than said pivoted floor element to enable an animal to pass well into said secondary runway before stepping upon said pivoted runway.

In testimony whereof, I have signed this specification in the presence of two subscribing witnesses, this fifteenth day of November 1909.

WILLIAM B. SPENCER.

Witnesses:
 D. H. FLETCHER,
 CARRIE E. JORDAN.